United States Patent
Feng

US007618541B2

(10) Patent No.: US 7,618,541 B2
(45) Date of Patent: Nov. 17, 2009

(54) METHOD OF DE-WATERING A SLURRY MIXTURE FROM A JET-GROUTING OPERATION AND AQUEOUS SUSPENSION FOR USE THEREIN

(75) Inventor: Qiu Feng, Urdorf (CH)

(73) Assignee: Construction Research & Technology GmbH, Trustberg (DE)

( * ) Notice: Subject to any disclaimer, the term of this patent is extended or adjusted under 35 U.S.C. 154(b) by 410 days.

(21) Appl. No.: 10/547,097

(22) PCT Filed: Feb. 27, 2004

(86) PCT No.: PCT/EP2004/001958

§ 371 (c)(1),
(2), (4) Date: Aug. 30, 2006

(87) PCT Pub. No.: WO2004/079102

PCT Pub. Date: Sep. 16, 2004

(65) Prior Publication Data

US 2007/0003378 A1    Jan. 4, 2007

(30) Foreign Application Priority Data

Mar. 6, 2003 (GB) ................................. 0305079.6

(51) Int. Cl.
*C02F 1/56* (2006.01)

(52) U.S. Cl. ...................................... 210/728; 210/732
(58) Field of Classification Search .................. 210/732
See application file for complete search history.

(56) References Cited

U.S. PATENT DOCUMENTS

| 3,020,231 | A | * | 2/1962 | Colwell et al. .............. 210/727 |
|---|---|---|---|---|
| 4,233,015 | A | | 11/1980 | Wright et al. |
| 4,457,842 | A | * | 7/1984 | Bereiter .................... 210/198.1 |
| 4,931,190 | A | * | 6/1990 | Laros ......................... 210/710 |
| 5,104,551 | A | * | 4/1992 | Davis et al. ................. 210/727 |
| 5,178,770 | A | * | 1/1993 | Chung ........................ 210/705 |
| 5,269,632 | A | | 12/1993 | Pelletier et al. |
| 5,342,538 | A | * | 8/1994 | Chung et al. ................. 252/180 |
| 5,370,478 | A | | 12/1994 | Bartlett et al. |
| 5,624,550 | A | * | 4/1997 | Iji et al. ...................... 210/104 |
| 5,645,731 | A | * | 7/1997 | Burdick et al. .............. 210/728 |
| 5,814,147 | A | | 9/1998 | Tallard |
| 5,980,446 | A | | 11/1999 | Gardner et al. |
| 6,979,405 | B2 | * | 12/2005 | Weir ........................... 210/727 |

* cited by examiner

*Primary Examiner*—Peter A Hruskoci
(74) *Attorney, Agent, or Firm*—Curatolo Sidoti Co., LPA; Joseph G. Curatolo; Salvatore A. Sidoti

(57) ABSTRACT

A method of de-watering a slurry mixture produced from a jet grouting operation, comprising the addition to the mixture of a high MW polyethylene oxide polymer, in such manner that it is uniformly distributed therein. The solids of the slurry are left in an easily and inexpensively-disposable form.

9 Claims, No Drawings

METHOD OF DE-WATERING A SLURRY MIXTURE FROM A JET-GROUTING OPERATION AND AQUEOUS SUSPENSION FOR USE THEREIN

CROSS REFERENCE TO RELATED APPLICATIONS

This application is a national stage application of International Application No. PCT/EP2004/001958, filed Feb. 27, 2004, which claims the benefit of Application No. GB 0305079.6, filed Mar. 6, 2003 from which applications priority is claimed.

This invention relates to jet grouting and to chemical compositions for use in jet grouting.

Jet grouting is a soil consolidating technique, widely used for many civil engineering applications. For example, it can be used to provide foundations for structures to be erected, to underpin existing structures, to create low permeability barriers, to create retaining or supporting structures, to reinforce a soil mass, and to complement other geotechnical structures. The jet grouting process consists of the disaggregation of the soil or weak rock and its mixing with, and partial replacement by, a cementing agent, normally a cement-based grout; the disaggregation is achieved by means of a high energy jet of a fluid which can be water or the grout itself, depending on the system employed.

First of all, a bore of typically 90-150 mm diameter is drilled in the soil to the depth to which the soil is to be consolidated. When the appropriate depth is reached, the rod is rotated in place and a fluid (water or the cementing grout itself) is injected at high pressure through nozzles placed at the end of the rod. This has the effect of cutting away the existing soil and replacing it with a soil-grout mixture that will harden. The rod is gradually withdrawn while injection through the rotating rod is continued. The result is a cylindrical column of consolidated soil that will harden and form a consolidated soil element. During the operation, the movement of the rod can be manipulated to form soil mass of different geometry, such as columns and panels.

While much of the soil is used in the consolidation, a large amount is carried away in the form of slurry, which is a mixture of soil, cement and water. The slurry is normally pumped away from the spot where the jet grouting operation is taking place, so, if the slurry is not fluid enough for pumping using a hydraulic conventional pump, additional water is normally added. The result is a slurry which contains a very large proportion of water, frequently in excess of 80%. Typical contents of a slurry are (by weight) 60-85% water and 5-25% each of both cement and soil (the latter generally clay or silty sand). However, it is not unknown for slurries to have compositions lying outside these ranges. In addition, such slurries can include other ingredients, such as placticisers, superplasticisers, accelerators and retarders, added to modify the properties of the grout.

The amount of slurry produced varies, depending on the type of soil treated. In clay soil where the jet grouting operation is typically much slower, the amount of slurry produced can be up to 5 $m^3$ per $m^3$ soil treated. While such slurries can sometimes be utilized in, for example, backfills, large amounts usually have to be disposed of in landfills, which is expensive for jet grouting contractors.

It has now been found that it is possible to de-water such a slurry mixture by a simple, effective treatment. This invention provides a method of de-watering a slurry mixture produced from a jet grouting operation, comprising the addition to the mixture of a high MW polyethylene oxide polymer, in such manner that it is uniformly distributed therein.

Polyethylene oxides are common materials of commerce and there are many varieties which work. By "high MW" is meant a weight-average MW of at least 1,000,000. Typical examples of suitable materials may be found in the "Polyox" (registered trade mark) range of Union Carbide Corporation, which have a range of high molecule weight polyethylene oxide having a MW range from 1,000,000 to 8,000,000.

The polyethylene oxide polymer can be introduced into the slurry either in the form of a solution, suspension or solid, in such manner that it becomes uniformly distributed therein. By "uniformly distributed" is meant that there are no agglomerations or concentrations of polyethylene oxide in the slurry. This generally means that addition in a form that readily allows this is best, for example, in solution or dispersion form. When the solid form is used, undesirable agglomeration may easily occur when the polyethylene oxide comes into contact with the slurry, which will lead to reduced effectiveness and operational problems. Thus, the polyethylene oxide must be added gradually with stirring, to avoid such agglomeration. The problems increase with the molecular weight, and particular care must be exercised when using higher molecular weight materials.

In the case of suspensions, the nature of the suspension will depend entirely on the shelf-life expected. For example, if the suspension is to be made in situ and used immediately, long-term stability is obviously of no great concern. However, if, as is often the case in commercial situations, a substantial shelf-life is required for transportation and storage (of the order of some months), measures must be taken to ensure this. The two problems encountered are gelling and sedimentation.

It is well known in the art that polyethylene oxide suspensions may be adequately stabilised from gelling by the addition of certain bases and salts to the water. When present in suitable concentrations, these cause the polyethylene oxide to become insoluble and form a suspension. Typical materials that have been used include sodium hydroxide, sodium chloride, sodium hydroxide/sodium chloride mixtures, ammonium hydroxide, magnesium sulphate, sodium sulphate, sodium phosphate, sodium sulphite and monobasic sodium phosphate. In the performance of this invention, it has been found that certain salts perform particularly well. These are sodium formate, potassium formate, sodium acetate, potassium acetate, potassium carbonate and sodium chloride/potassium carbonate mixtures. The invention therefore also provides a method as hereinabove described, in which the polyethylene oxide is in the form of an aqueous suspension which also contains a stabilising quantity of a salt selected from the group consisting of sodium formate, potassium formate, sodium acetate, potassium acetate, potassium carbonate and potassium carbonate/sodium chloride mixtures. The invention also provides, as a composition of matter, a stable aqueous suspension of polyethylene oxide, to which has been added a stabilising quantity of a salt selected from the group consisting of sodium formate, potassium formate, sodium acetate, potassium acetate, potassium carbonate and potassium carbonate/sodium chloride mixtures.

The quantity of salt or base needed to stabilise any given polyethylene oxide suspension will vary according to MW, concentration of polyethylene oxide present and length of shelf-life needed. Such things can be readily determined by means of routine experimentation, but typical quantities (as % by weight of salt in salt+water) are shown in the following table:

|  | typical concentration | preferred concentration |
| --- | --- | --- |
| sodium formate | 20-32.9 | 28-32 |
| sodium acetate | 25-saturation | 28-32 |
| potassium formate | 25-saturation | 28-35 |
| potassium acetate | 25-saturation | 28-35 |
| potassium carbonate | 30-saturation | 35-40 |

In the case of the potassium carbonate/sodium chloride mixture, potassium carbonate is the primary material, because sodium chloride alone does not give adequate stability for the purposes of this invention, especially at higher temperatures. However, it has been found that the combination of potassium carbonate with sodium chloride overcomes this problem. The proportion of the two can vary considerably. Thus, to a saturated solution of sodium chloride, quite a lot of potassium carbonate can be added before its saturation level is reached. At the other extreme, to a saturated solution of potassium carbonate, a relatively small proportion of sodium chloride can be added, before its saturation level is reached. These levels will vary with temperature, but typically, at room temperature, a saturated sodium chloride solution contains about 25% by weight of sodium chloride. To this, the quantity of potassium carbonate that can be added until that reaches saturation is about 20% of the total solution (water+NaCl+$K_2CO_3$). In the reverse case, saturated potassium carbonate (about 51%), sodium chloride may be added up to about 2.4% of water+NaCl+$K_2CO_3$, before that saturates. These proportions will naturally change if saturation levels are not used, but the skilled person will readily be able to determine by simple experimentation a suitable proportion for any given circumstance.

Suspensions formed using the abovementioned salts are stable against gelling, but if left standing for a long period (hours or days), settling can occur. This can be prevented by using a rheology modifier, added to the water before the salt is added. A rheology modifier which has been found to be effective for this is xanthan gum; an example of a commercial material is KELZAN (registered trade mark) of Pkelco. Suspensions which contain from 0.05-0.5%, preferably from 0.1-0.25%, xanthan gum has been found to be stable for more than three months in the laboratory.

With respect to the polyethylene oxides themselves, typical dosage rates are shown in the table below for some commercial polyethylene oxide grades:

| Trade name | M.W. | Typical dosage rate (% by wt of slurry) | Preferred dosage rate |
| --- | --- | --- | --- |
| POLYOX WSRN-12K | 1M | 0.065-0.095 | 0.075-0.085 |
| POLYOX WSRN-60K | 2M | 0.045-0.075 | 0.055-0.065 |
| POLYOX WSR301 | 4M | 0.025-0.045 | 0.030-0.040 |
| POLYOX WSR308 | 8M | 0.020-0.040 | 0.025-0.035 |

At the dosage rates shown above, clear water can be separated out from the slurry, leading to more than 50% volume reduction of the original slurry, and a change in the slurry consistency to that of a stiff mortar. Of course, because of the nature of jet grouting, the composition of slurry may vary considerably, so the exact dosage rate for the de-watering polymer will also vary somewhat, and the dosage rate values given above are typical values only, and other dosage rates other than those mentioned above may be equally effective.

By simple experimentation, the skilled person can readily ascertain how much of the polymer is needed for a given slurry.

In the process according to the invention, the polyethylene oxide is added with stirring. This has the effect of separating water out of the soil-cement slurry, and changing the consistency of the slurry from fluid to stiff mortar-like. The separation normally takes less than 10 minutes when some agitation is employed, and the separated water can be simply drained out, or some pressure may be employed to press it out. The water which comes out is normally clear, and after appropriate neutralization can be simply discharged into the sewage system, or where allowed, the open environment. As a result, the disposal cost such as in a landfill for the abovementioned slurry would be drastically reduced, because of the lower volume of slurry due to de-watering, and the lower price for disposing of dry material as opposed to fluid material.

For the optimum working of the process according to the invention, the solids content by weight of a slurry to be treated should generally be 40% maximum, preferably 35% maximum, as measured by drying a sample in an oven at 105° C. These contents figures are based on a relatively uniform distribution of particle sizes of clay, silt, cement, etc. in the slurry. However, when such a slurry contains a minor proportion of materials of larger particle size, such as sand and lumps of clay (as can happen in practice), the measured solids content of a given sample can be considerably higher. In such a case, the performance of the process of the invention is unaffected, and, for the purposes of this invention, such a slurry is considered to fall within the solids content limits given hereinabove.

The invention is further described with reference to the following non-limiting examples.

EXAMPLE 1

A slurry composition which is similar to a jet grouting slurry and which has the following composition is prepared: 70% water, 15% cement, 15% Bodmer clay (dry solid). This slurry has a fluid consistency and is stable. To 200 g of this slurry is added 6 g of a 2% by weight solution of POLYOX WSRN-60K polyethylene oxide. This mixture is agitated to mix the polymer into the slurry. Gently stirring is continued, and flocculation of the solid occurs, and clear water will separate from the solid. 90 g water is separated from the slurry is. The remaining solid is a stiff mortar.

EXAMPLE 2

A slurry composition which is similar to a jet grouting slurry having the following composition is prepared: 70% water, 15% cement, 15% Bodmer clay (dry solid), all by weight. This slurry has a fluid consistency and is stable. To 200 g of this slurry is added 6.6 g of a 1% by weight suspension of POLYOX WSR301 polyethylene oxide, and the 30 mixture agitated slightly to mix the polymer into the solution. Gentle stirring is continued and water separates from the solid. 92 g clear water is separated from the slurry, the remaining solid being a stiff mortar.

EXAMPLE 3

A stable suspension of a high molecular weight polyethylene oxide is made as follows:

0.5 g xanthan gum (Kelzan®, available from PKELCO) is added slowly with stirring to 544.5 g water. Stirring is continued until the xanthan gum is fully dissolved. 255 g sodium formate (available from Fluka) is added and stirring is continued until all the sodium salt is dissolved. Finally, 200 g POLYOX WSR301 (available from Union Carbide) is added, and stirring is continued for several more minutes. The final suspension is stable against gelling and settling for more than 45 days at 20° C.

EXAMPLE 4

A slurry composition which is similar to a jet grouting slurry having the following composition is prepared: 70% water, 15% cement, 15% London clay (dry solid), all by weight. This slurry has a fluid consistency and is stable. To 200 g of this slurry is added 0.32 g of a 20% by weight suspension of POLYOX WSR301, as prepared in example 3, and the mixture agitated slightly. After waiting for about 2 minutes to allow the polymer to dissolve, the mixture is again stirred. With continued gentle stirring, clear water separates from the solid. 92 g clear water is separated from the slurry, and the remaining solid is a stiff mortar.

The invention claimed is:

1. A method of de-watering a slurry mixture produced from a jet grouting operation, comprising the addition to the mixture of a high molecular weight polyethylene oxide polymer, in such manner that it is uniformly distributed therein, separating water out of the slurry, and changing slurry consistency to that of a stiff mortar; wherein the polyethylene oxide polymer has a weight-average molecular weight of at least 1,000,000.

2. A method according to claim 1, in which the polyethylene oxide is added as an aqueous suspension, which is stabilised by the presence of at least one base or salt.

3. The method of claim 2 wherein the polyethylene oxide is added as an aqueous suspension, which is stabilized by the presence of at least one of sodium hydroxide, sodium chloride, ammonium hydroxide, magnesium sulphate, sodium sulphate, sodium phosphate or mixtures thereof.

4. The method of claim 2 wherein the polyethylene oxide is added as an aqueous suspension, which is stabilized by the presence of at least one of sodium formate, potassium formate, sodium acetate, potassium acetate, potassium carbonate, potassium carbonate/sodium chloride mixtures or mixtures thereof.

5. The method of claim 2 wherein a rheology modifier is added to the aqueous suspension before the addition of salt.

6. The method of claim 5 wherein xanthan gum is added to the aqueous suspension before the addition of salt.

7. The method of claim 1 wherein the polyethylene oxide added has a weight-average molecular weight of 1,000,000 to 8,000,000.

8. The method of claim 1 wherein the polyethylene oxide is added as at least one of a solution, suspension, dispersion or solid.

9. The method of claim 1 wherein the polyethylene oxide is added with stirring.

* * * * *

UNITED STATES PATENT AND TRADEMARK OFFICE
CERTIFICATE OF CORRECTION

PATENT NO.       : 7,618,541 B2                                                          Page 1 of 1
APPLICATION NO. : 10/547097
DATED            : November 17, 2009
INVENTOR(S)      : Qiu Feng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this

Twenty-sixth Day of October, 2010

David J. Kappos
*Director of the United States Patent and Trademark Office*